Jan. 2, 1951 R. G. F. LOEWY 2,536,194
PASSENGER VEHICLE
Filed Sept. 28, 1946 5 Sheets-Sheet 1
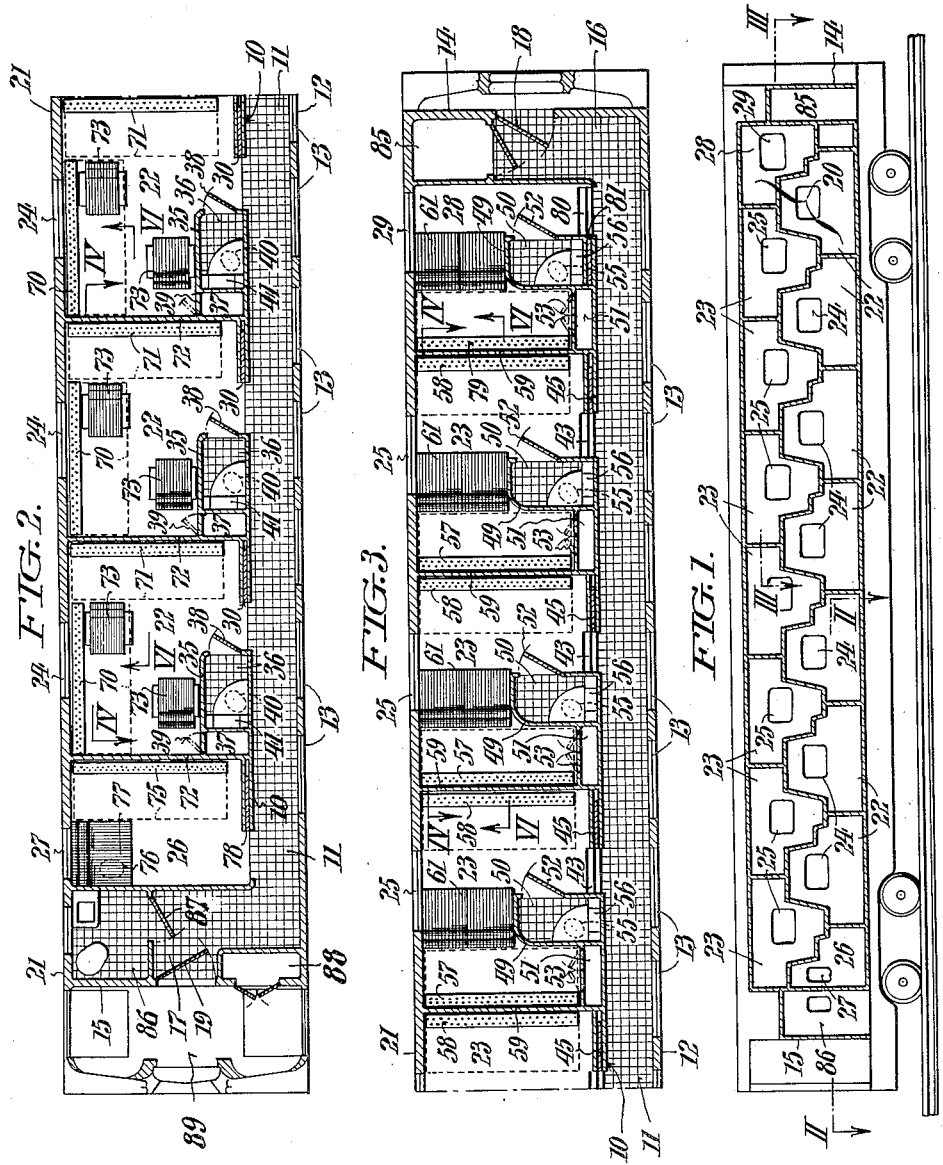
WITNESSES
Hubert Fuchs
George L. Comly
INVENTOR:
Raymond G. F. Loewy,
BY Paul & Paul
ATTORNEYS.

Jan. 2, 1951   R. G. F. LOEWY   2,536,194
PASSENGER VEHICLE

Filed Sept. 28, 1946   5 Sheets-Sheet 2

WITNESSES
Hubert Fuchs
George L. Comly

INVENTOR:
Raymond G. F. Loewy,
BY Paul & Paul
ATTORNEYS.

Jan. 2, 1951 R. G. F. LOEWY 2,536,194
PASSENGER VEHICLE
Filed Sept. 28, 1946 5 Sheets-Sheet 3
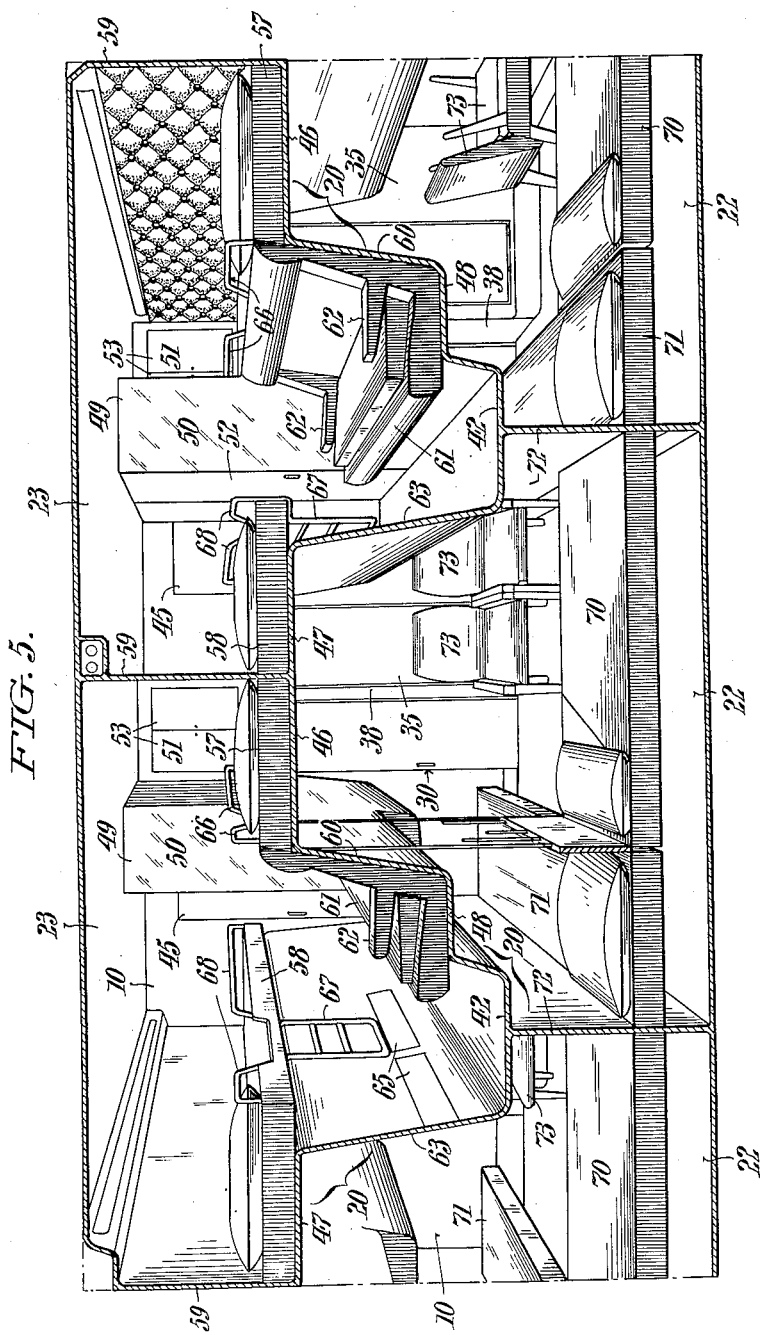
WITNESSES
Hubert Fuchs
George L. Conly
INVENTOR:
Raymond G. F. Loewy,
BY Paul & Paul
ATTORNEYS.

Jan. 2, 1951  R. G. F. LOEWY  2,536,194
PASSENGER VEHICLE
Filed Sept. 28, 1946  5 Sheets-Sheet 4
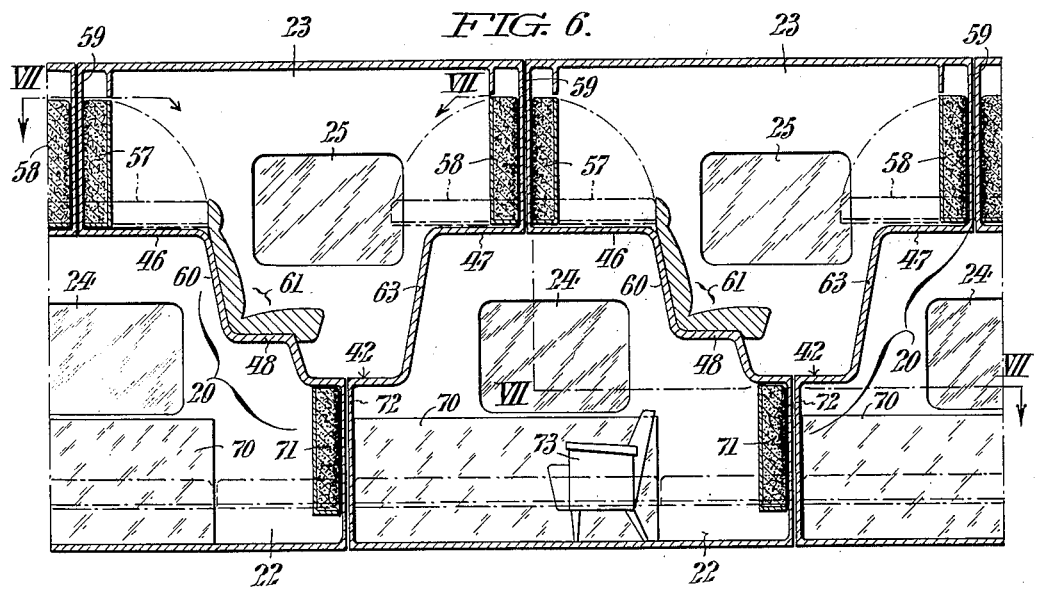
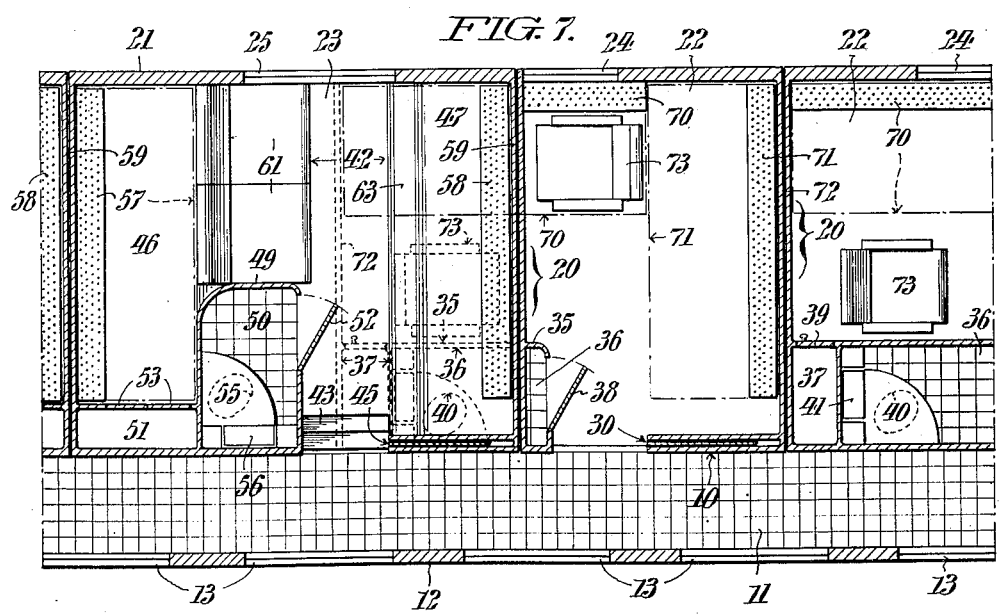
WITNESSES
Hubert Fuchs
George L. Comby
INVENTOR:
Raymond G. F. Loewy,
BY Paul & Paul
ATTORNEYS.

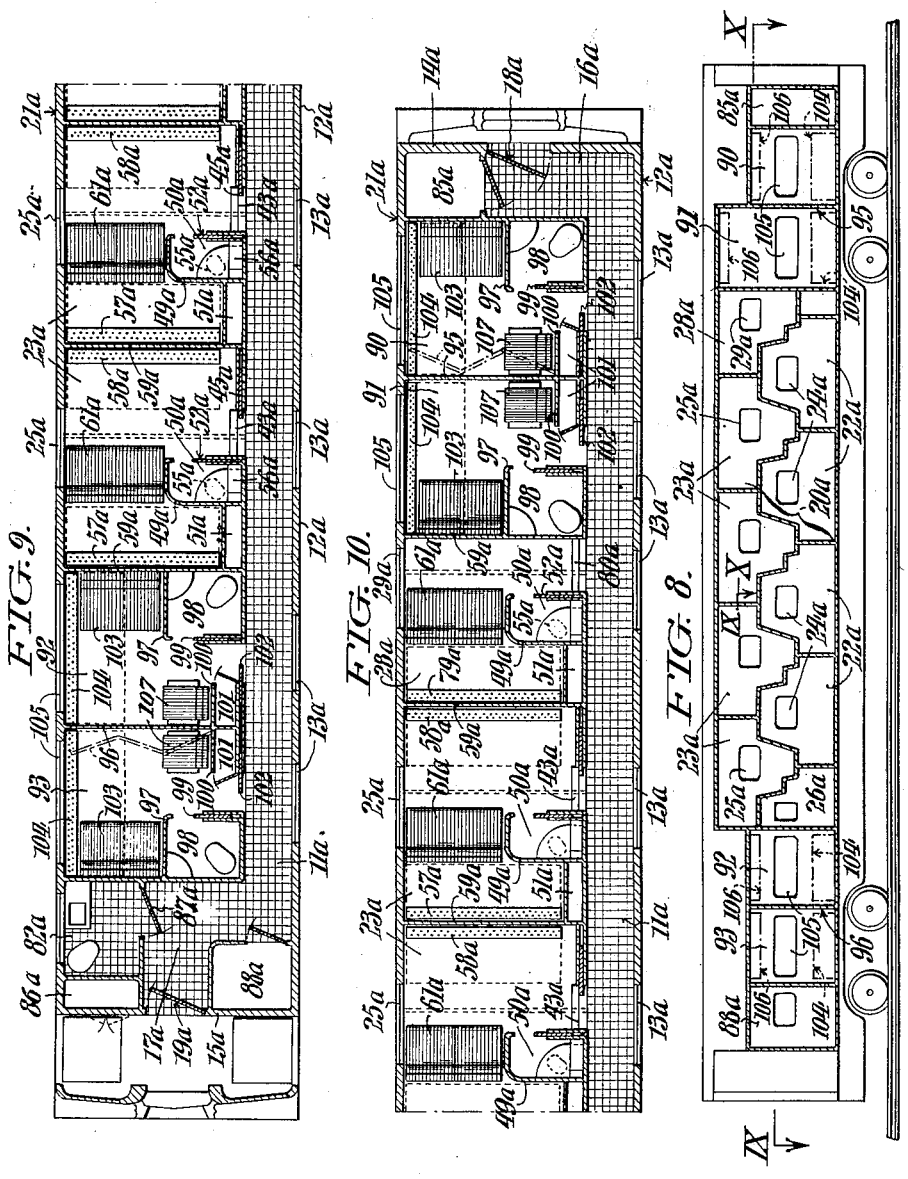

Patented Jan. 2, 1951

2,536,194

UNITED STATES PATENT OFFICE 2,536,194

PASSENGER VEHICLE

Raymond G. F. Loewy, Sands Point, N. Y., assignor to The Pennsylvania Railroad Company, Philadelphia, Pa., a corporation of Pennsylvania Application September 28, 1946, Serial No. 700,030

8 Claims. (Cl. 105—315)

1

This invention relates to passenger vehicles such as railway cars, busses etc., and has reference more especially to compartment vehicles.

The chief aim of my invention is to increase the passenger-carrying capacity of vehicles of the kind referred to, particularly railway passenger cars, and at the same time afford the occupants absolute privacy with ample space for free movement about in the compartments, as well as to provide them with private toilet and other facilities for their complete comfort both during the day and at night over long or extended periods of travel.

How the foregoing and other important objects and advantages are realized in practise will appear from the following.

Other objects and attendant advantages will appear from the following detailed description of the attached drawings, wherein Fig. 1 is a diagrammatic view in longitudinal section of a railway passenger car conveniently embodying my invention in one form.

Figs. 2 and 3 are horizontal sections taken as respectively indicated by the angled arrows II—II and III—III in Fig. 1.

Fig. 5 is a similar view showing the compartments arranged for sleeping.

Fig. 6 is a longitudinal section taken as indicated by the angled arrows VI—VI in Figs. 2 and 3.

Fig. 7 is a staggered horizontal section taken as indicated by the angled arrows VII—VII in Fig. 6; and Figs. 8, 9 and 10 are views corresponding to Figs. 1-3 showing a modification, Figs. 9 and 10, considered together, being a horizontal section taken as indicated by the angled arrows IX—X in Fig. 8.

Figure 4:
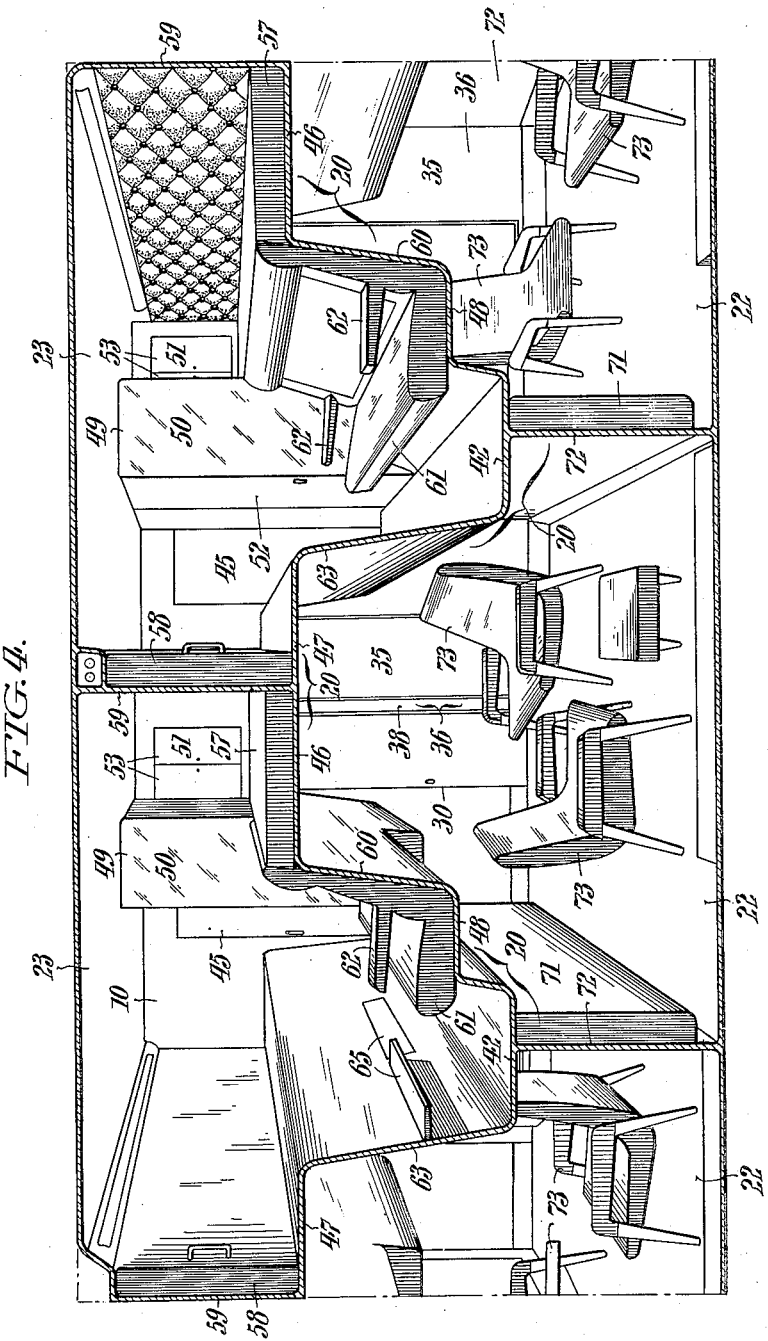
Fig. 4 is a view in fragmentary longitudinal section in perspective taken as indicated by the angled arrows IV—IV in Figs. 2 and 3 showing the compartments arranged for daytime use.

The railway passenger car herein illustrated, for convenience of exemplifying my invention, has a lengthwise partition 10 which sets apart a longitudinal aisle or corridor along one of the side walls 12 with windows 13 at intervals therealong, and which terminates short of the front and rear end walls 14 and 15 of the car, with resultant provision of lateral passages 16 and 17 from central entrant doors 18 and 19 respectively in said end walls. By means of stepped partitioning generally designated 20 in Fig. 1 which extends transversely between the longitudinal partition 10 and the opposite side wall 21 of the

2 car, the intervening space is subdivided into a series of mutually overlapping duplex or two-passenger lower and upper compartments 22 and 23 having individual windows 24 and 25 in said opposite side wall, a single or one person lower compartment 26 with a window 27 at the rear end of the car, and a single or one person upper compartment 28 with a window 29 at the front end of the car. The lower compartments 22 have floors which are continuous with and at the level of the corridor floor, and are individually accessible from the corridor 11 through sliding doors 30 in the lengthwise partition 10.

Supplemental partitioning 35 defines, in conjunction with the partition 10, a toilet closet 36 and a storage closet 37, both of full height, in one of the inner corners of each lower compartment 22, said closets being individually accessible from within the compartment by way of swinging doors 38 and 39 respectively. As shown, each toilet closet 36 is fitted with a toilet bowl 40 and a swingdown wash basin 41. The floors of the upper compartments 23 are well above the floor level of the lower compartments and constituted by horizontal portions 42 of the transverse partitioning 20, and are reached from the corridor 11 by way of individual stairways 43 upon opening of individual sliding doors 45 (see Fig. 3) in the lengthwise partition 10. The crosswise partitioning 20, it will be noted from Figs. 1, 5 and 6, provides transverse single bed ledges 46 and 47 at opposite ends of the respective upper compartments 23 at an elevation above the floors 42, and also transverse two passenger seat ledges 48 at a lower level beneath the bed ledges 46.

Supplemental partitioning 49 (Figs. 3 and 7) in conjunction with the lengthwise partition 10, defines within each upper compartment 23 a toilet closet 50 and a contiguous storage closet 51, these closets being individually accessible from within the compartment through doors 52 and 53. Each toilet closet 50 corresponds in height with the compartment 23 and is in line with the seat ledge 48 (see Fig. 5) and is fitted, like the toilet closet in each lower compartment, with a bowl 55 and a swing-down wash basin 56. The storage closet 51, however, extends only from the level of the bed ledge 46 to the ceiling of the compartment 23, the same being in line with said ledge as shown in Figs. 3 and 5. Each upper compartment 23 is moreover provided with self-contained bed units 57 and 58 which are normally stored upright against vertical subdividing portions 59 of the transverse partitioning 20 above the bed ledges 46 as shown in Figs. 4 and 6, but which, when their use is required, can be swung down to horizontal position as shown in Fig. 5 onto said ledges. Mounted on the seat ledge 48 in each upper compartment 23 with its back secured to a sloping portion 60 of the transverse partitioning 20, is an upholstered seat 61 for the two persons, said seat having an arm rest 62 at each end, see Figs. 4 and 5. The opposite sloped portion 63 of the transverse partitioning in each upper compartment 23 is provided with foot rests 65 which can be swung downward out of the way when the compartment is converted for night use. The bed 57 is reached simply by stepping on the seat 61 and grasping a hand rail 66 (Fig. 5) which is made collapsible against said bed when the latter is stored. The bed 58 is reached by way of an attached collapsible ladder 67, it being also provided with a retractible hand rail 68.

Each lower compartment 22 is provided with a longitudinally and a transversely-arranged beds 70 and 71. The bed 70 is ordinarily stored in upright position along the side wall 21 of the car beneath the window 24, as shown in Figs. 6 and 7, and is constructed so that it can be placed horizontally as shown in Fig. 5 when it is to be used, suitable means (not illustrated) being in practice provided to support it in the latter position. The bed 71 is normally stored in upright position as shown in Figs. 6 and 7 against a vertical subdividing portion 72 of the transverse partitioning 20 at one end of the compartment 22 beneath the seat ledge 48 of one of the overlying upper compartments 23, and constructed so that it may be swung down to horizontal usable position as shown in Fig. 5. Each lower compartment 22 is further furnished with chairs 73 which can be moved about when used in the daytime, and which can be stacked out of the way in an empty corner of the compartment, as shown in Fig. 5, when the beds 70 and 71 are to be used. The lower compartment 26 at the left or rear end of the car has but a single bed 75 which is transversely arranged, and which can ordinarily be stored like the corresponding beds of the other lower compartments. The lower end compartment 26 however, has no toilet closet but is furnished with a toilet bowl 76 beneath a liftable daytime seat 77, said bowl being accessible from the aisle 11 through a separate sliding door 78 in the lengthwise partition 10.

The upper compartment at the right-hand or front end of the car also has but a single bed 79, although it is otherwise fitted out like the upper duplex compartments 22, access being had thereto from the corridor 11 by way of a separate stairway 80 and door 81, as will be readily seen from Fig. 3.

In practice, the portions 42 and 46, 47 of the transverse partitioning 20 are disposed at such levels as will insure full standing height centrally of both the lower and upper compartments 22 and 23, as well as ample head room above the beds in said compartments for complete comfort of the occupants. It is to be noted that the seats 61 in the upper compartments 23 all face forwardly, i. e., in the direction in which the car travels.

Disposed in one corner at the front end of the car is a closet 85 which is accessible from the passage 16, and which is serviceable for storage of accessories such as towelling, bed sheeting, soap, etc.

In one of the rear corners of the car is a toilet room 86 which is intended for the general use of the passengers, and which is entered through a door 87 from the passage 17. In the other rear corner of the car is a closet 88 for containment of air conditioning equipment, the same having doors which open into the rear vestibule 89.

In the modification shown in Figs. 8, 9 and 10, the mid portion of the car is subdivided in exactly the same way as in the first described embodiment into mutually overlapping pairs of lower and upper duplex compartments 22a and 23a, with inclusion of single lower and upper end compartments 26a and 28a respectively. It is to be understood that these several compartments have appointments which are identical with those of the first embodiment. Here however two master compartments are provided at each end of the car, these being respectively designated by the numerals 90, 91 and 92, 93, and may be made communicative by folding back collapsible portions of partitions 95 and 96 which normally separate them, as indicated in dot and dash lines in Figs. 9 and 10. Set apart by supplemental partitioning 97 in the relatively remote inner corners of the master compartments 90, 91 and 92, 93 are toilet closets 98 with individual sliding doors 99. Other supplemental partitioning at 100 defines, in each master compartment 90—93 a closet 101 for personal belongings, said closet and the corresponding toilet being at opposite sides of a center door 102 leading to the corridor 11a. At one end in the interval between the toilet 98 and the side wall 21a of the car, each master compartment is furnished with a built in transverse seat 103 having a fold down back which is designed to serve as a rest for one end of a longitudinally arranged bed 104 normally stored on edge against said wall beneath the compartment window 105. Each master compartment is also furnished with a second bed 106, see Fig. 8, which is normally stored laterally of the car flat against the ceiling of the compartment adjacent the window wall. When lowered for sleeping, the second bed 106 will be directly over the bed 104 in extended position. In addition, each of the master compartments 90—93 is provided with a chair 107 which can be moved against the inner side wall of the closet 101 when the bed 104 is to be used. As in the first described embodiment, the modified car of Figs. 8-10 has a utility closet 85a accessible from the lateral passage 16a at the front end, a public toilet 82a and a chamber 88a for air conditioning equipment both accessible, in this instance, from the transverse passage 17a at the rear end of the car.

I claim:

1. A passenger vehicle of the character described with a lengthwise partition setting apart a corridor along one side wall thereof; crosswise partitioning between said lengthwise partition and the opposite side wall of the vehicle defining plural lower compartments having floors on a common level with that of the corridor, in alternation with plural overlapping under compartments, said crosswise partitioning providing a floor for each upper compartment at a level above that of the corridor, transverse bed ledges at opposite ends of each upper compartment at an elevation above the floor, and a transverse seat ledge at an intermediate elevation in parallel relation to and backing toward one of the bed ledges; individual doors affording direct access from the corridor to the lower compartments; individual stairs leading from the corridor to access doors for the upper compartments; and a window for each upper and lower compartment in said opposite side wall of the vehicle.

2. A passenger vehicle according to claim 1, wherein a transversely arranged bed in each lower compartment is located below the seat ledge of an overlying upper compartment.

3. A passenger vehicle according to claim 1, wherein each lower compartment is furnished with two beds, one of which is movable to horizontal position for use from a normally upright storage position against the window wall of the car beneath the window, and the other which is movable to horizontal position for use from a normally upright storage position against a vertical dividing portion of the crosswise partitioning below the seat ledge of an overlying upper compartment.

4. A passenger vehicle according to claim 1, wherein the bed ledges extend transversely of the full width of each upper compartment between the lengthwise partition and the bounding side wall of the vehicle.

5. A passenger vehicle according to claim 1, wherein the bed ledges extend transversely of the full width of each upper compartment between the lengthwise partition and the bounding side wall of the vehicle; wherein the seat ledge extends to said side wall but terminates short of the lengthwise partition; and wherein a toilet closet accessible from within each upper compartment is built into the interval between said lengthwise partition and the contiguous end of the seat ledge.

6. A passenger vehicle according to claim 1, wherein one of the bed ledges in each upper compartment is of full bed width, and the other bed ledge is narrower; and wherein a full size swing-down bed is provided for the narrower bed ledge which bed, when in usable position, overhangs said narrower ledge.

7. A passenger vehicle according to claim 1, wherein the bed ledge with which the seat ledge is associated in each upper compartment is of full bed width, and the other bed ledge is narrower; and wherein a full width swing-down bed is provided for the narrower ledge which, when in usable position, overhangs said narrower ledge.

8. A passenger vehicle according to claim 1, wherein a straight full-height bulk head partition sets apart at one end of the vehicle, a small upper compartment having a single bed ledge with an adjacent seat ledge; and wherein a similar straight full-height bulk head partition at the other end of the vehicle sets apart a small lower compartment having a transversely-arranged bed beneath the seat ledge of the immediately adjacent upper compartment.

RAYMOND G. F. LOEWY.

REFERENCES CITED

The following references are of record in the file of this patent:

UNITED STATES PATENTS

| Number | Name | Date |
| --- | --- | --- |
| 1,569,754 | Hutt | Jan. 12, 1926 |
| 2,000,547 | Woodward | May 7, 1935 |
| 2,000,549 | Woodward | May 7, 1935 |
| 2,316,710 | Parke | Apr. 13, 1943 |